United States Patent
Kawabe et al.

(10) Patent No.: US 9,890,734 B2
(45) Date of Patent: Feb. 13, 2018

(54) ENGINE WITH CYLINDERS EACH HAVING DIRECT INJECTION NOZZLE AND PORT INJECTION NOZZLE, AND INJECTING FUEL FROM PORT INJECTION NOZZLE WHEN INTAKE VALVE IS CLOSED DURING INITIAL FUEL INJECTION

(71) Applicant: MITSUBISHI JIDOSHA KOGYO KABUSHIKI KAISHA, Tokyo (JP)

(72) Inventors: Takashi Kawabe, Tokyo (JP); Fumiaki Hiraishi, Tokyo (JP); Nobuaki Murakami, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 220 days.

(21) Appl. No.: 14/704,307

(22) Filed: May 5, 2015

(65) Prior Publication Data

US 2015/0233317 A1 Aug. 20, 2015

Related U.S. Application Data

(63) Continuation of application No. PCT/JP2013/075487, filed on Sep. 20, 2013.

(30) Foreign Application Priority Data

Dec. 27, 2012 (JP) .................................. 2012-286109

(51) Int. Cl.
*F02D 41/30* (2006.01)
*F02D 41/06* (2006.01)

(52) U.S. Cl.
CPC ....... *F02D 41/3094* (2013.01); *F02D 41/062* (2013.01)

(58) Field of Classification Search
CPC .......................... F02D 41/3094; F02D 41/062
See application file for complete search history.

(56) References Cited

U.S. PATENT DOCUMENTS 4,080,949 A * 3/1978 Brinkman ........... F02D 41/3094
                                                   123/431
5,924,405 A    7/1999 Hashimoto
(Continued)

FOREIGN PATENT DOCUMENTS

CN   101091050 A   12/2007
JP   7-224699 A    8/1995
(Continued)

*Primary Examiner* — David Hamaoui
(74) *Attorney, Agent, or Firm* — Birch, Stewart, Kolasch & Birch, LLP

(57) ABSTRACT

An engine includes first nozzles, second nozzles and a control unit. The first nozzles are arranged in cylinders, and inject fuel directly into the cylinders respectively. The second nozzles are arranged in intake ports of the cylinders, and inject fuel into the intake ports respectively. The control unit controls fuel injection of the first nozzles and the second nozzles. When the engine is started, the control unit performs initial fuel injection by one of the first and second nozzles into the cylinders having odd-number of initial ignition order, and performs initial fuel injection by the other one of the first and second nozzles into the cylinders having even-number of initial ignition order.

8 Claims, 7 Drawing Sheets

(56) References Cited

U.S. PATENT DOCUMENTS

| | | | |
|---|---|---|---|
| 7,082,926 B2 * | 8/2006 | Sadakane | F02B 7/02 |
| | | | 123/299 |
| 9,222,453 B2 * | 12/2015 | Gibson | F02D 41/042 |
| 9,303,577 B2 * | 4/2016 | Surnilla | F02D 41/062 |
| 2005/0016500 A1 | 1/2005 | Borg et al. | |
| 2005/0235959 A1 | 10/2005 | Sadakane et al. | |
| 2006/0054137 A1 | 3/2006 | Tokuda et al. | |
| 2006/0207556 A1 * | 9/2006 | Miyazaki | F02D 41/064 |
| | | | 123/431 |
| 2006/0207567 A1 * | 9/2006 | Yamaguchi | F02D 41/042 |
| | | | 123/431 |
| 2006/0225695 A1 | 10/2006 | Fukasawa | |
| 2009/0082937 A1 | 3/2009 | Hokuto et al. | |
| 2014/0251280 A1 * | 9/2014 | Ikoma | F02D 41/042 |
| | | | 123/478 |

FOREIGN PATENT DOCUMENTS

| | | |
|---|---|---|
| JP | 10-176574 A | 6/1998 |
| JP | 2005-113693 A | 4/2005 |
| JP | 2005-226529 A | 8/2005 |
| JP | 2005-307916 A | 11/2005 |
| JP | 2006-258017 A | 9/2006 |
| JP | 2012-67639 A | 4/2012 |

* cited by examiner

| Ignition order | Cylinder No. | Starting Asynchronous injection | Number of cycles | | | | | | | |
|---|---|---|---|---|---|---|---|---|---|---|
| | | | 1 | 2 | 3 | 4 | 5 | 6 | 7 | 8 |
| 1 | #1 | Exhaust PI | Intake | Com-pression ★ | Power | Exhaust PI | Intake | Com-pression ★ | Power | Exhaust |
| 2 | #3 | Power | Exhaust | Intake | Com-pression DI ★ | Power | Exhaust PI | Intake | Com-pression ★ | Power |
| 3 | #4 | Com-pression PI | Power | Exhaust | Intake | Com-pression ★ | Power | Exhaust PI | Intake | Com-pression |
| 4 | #2 | Intake | Com-pression | Power | Exhaust | Intake | Com-pression DI ★ | Power | Exhaust PI | Intake |

PI injection → DI injection

F I G. 2

ENGINE WITH CYLINDERS EACH HAVING DIRECT INJECTION NOZZLE AND PORT INJECTION NOZZLE, AND INJECTING FUEL FROM PORT INJECTION NOZZLE WHEN INTAKE VALVE IS CLOSED DURING INITIAL FUEL INJECTION

CROSS REFERENCE TO RELATED APPLICATIONS

This application is a Continuation Application of PCT Application No. PCT/JP2013/075487, filed Sep. 20, 2013 and based upon and claiming the benefit of priority from prior Japanese Patent Application No. 2012-286109, filed Dec. 27, 2012, the entire contents of all of which are incorporated herein by reference.

BACKGROUND OF THE INVENTION

1. Field of the Invention

The present invention relates to an engine which has two systems of fuel injection nozzles, one of which includes fuel injection nozzles for direct injections in cylinders and another of which includes fuel injection nozzles for port injections. The engine controls fuel injection by selectively using one of the systems when the engine is started.

2. Description of the Related Art

There is an internal combustion engine provided with a fuel injection valve for cylinder injections and a fuel injection valve for intake port injections. Improvement of fuel efficiency is attempted by selectively using one of the two fuel valves in accordance with the driving state. Since the engine temperature is low, what is called "cold state", when the internal combustion engine is started, a combustion state is not stabilized in order that evaporation of fuel does not proceed. It is expected that the vaporization of fuel is facilitated by making the pressure of fuel injected from the fuel injection valve for the cylinder injection in the cylinder high, but there is no residual pressure in many cases when the internal combustion engine is cold state, and it takes a while to sufficiently increase the injection pressure.

An internal combustion engine described in Patent Document 1 includes a main injector for injecting and supplying fuel directly into a cylinder, and a sub-injector for injecting and supplying fuel into an intake passage. A fuel injection control unit of this internal combustion engine injects fuel in an intake stroke from at least the sub-injector when the fuel injection pressure measured by a pressure sensor is lower than a predetermined pressure and when temperature of engine cooling water measured by a temperature sensor is lower than predetermined temperature. It is described that even if the pressure of injected fuel is low and the diameter of fuel particles is large, the fuel is vaporized before it is supplied to the cylinder, and is mixed with air.

An internal combustion engine described in Patent Document 2 includes an intra-cylinder injector for injecting fuel into a cylinder and an intake passage injector for injecting fuel into an intake passage. When the internal combustion engine is started, a control unit of the internal combustion engine injects fuel only from the intra-cylinder injector when the internal combustion engine is warm, and the control unit injects fuel only from the intake passage injector when the internal combustion engine is cold. Fuel is injected by the intra-cylinder injector during a compression stroke, and fuel is injected by the intake passage injector during an intake stroke. It is described that even if the internal combustion engine is cold, vaporization of fuel is facilitated by injecting fuel into the intake passage as in Patent Document 1.

An internal combustion engine described in Patent Document 3 includes a port injection valve arranged in an intake passage of each of cylinders, and intra-cylinder injection valves arranged in at least two of the cylinders. The intra-cylinder injection valve is arranged in each of the cylinders which are arranged such that a stroke is brought into a compression stroke or a power stroke when an arbitrary one cylinder and this cylinder are brought into a stroke other than the compression stroke or other than the power stroke. When it is required to start the internal combustion engine, a control unit of the engine injects fuel into cylinders which are in the intake stroke and the exhaust stroke by the port injection valve, and injects fuel into cylinders which are in the compression stroke or the power stroke by the intra-cylinder injection valve. It is described that since the engine is configured as described above, even if the crankshaft stops at any angle, initial combustion is swiftly obtained from a cylinder into which fuel is injected by the intra-cylinder injection valve at a first cycle of start of the engine, and the engine is swiftly started.

It is also described in Patent Document 3 that all of cylinders in an in-line four-cylinder internal combustion engine have intra-cylinder injection valves and port injection valves. According to this internal combustion engine, at the point of start requirement to start the engine, two of the cylinders are surely in the compression stroke and the power stroke irrespective of the angle of rotation of the crankshaft. According to this, stronger initial combustion is obtained. An example in which the same technique is applied to a V-six engine is also described. It is described that the intra-cylinder injection valves are arranged in any one of the cylinders and a cylinder which is deviated in phase from the former cylinder through 360° in the crank angle and according to this, initial combustion is reliably obtained in a first cycle.

CITATION LIST

Patent Literatures

Patent Document 1: Jpn. Pat. Appln. KOKAI Publication No. 10-176574
Patent Document 2: Jpn. Pat. Appln. KOKAI Publication No. 2006-258017
Patent Document 3: Jpn. Pat. Appln. KOKAI Publication No. 2012-67639

BRIEF SUMMARY OF THE INVENTION

Technical Problem

In Patent Documents 1 and 2, when the engine is started from a cold state in which the engine is cold, fuel is injected from the intake passage injector (sub-injector). However, when the engine is started from the cold state, fuel injected from the intake passage injector adheres to an inner surface of an intake port, and the fuel is diluted more than a supplied amount. Hence, in order to obtain injected fuel of originally necessary concentration, it is necessary to inject more fuel. Generally, when an engine which injects fuel through a port is started from the cold state, to secure time during which fuel is sufficiently vaporized, fuel is initially injected into all of the cylinders asynchronously, and is then injected into each of the cylinders in order. When the engine is started from the cold state by the port injection in this manner, more fuel than necessary for combustion is consumed.

Patent Document 3 is intended for restart after an idling stop, i.e., start in a warm state in which the engine becomes warm, and fuel for start is supplied from the intra-cylinder injection valve. When fuel is injected from the intra-cylinder injection valve at the same time when the starting operation is begun, the torque of the engine is insufficient, and the fuel injection pressure cannot be increased sufficiently. Hence, the diameter of the fuel particles does not become small; in other words, the fuel is not atomized easily. As a result, exhaust smoke increases. If the fuel-injection pressure is low, the injected fuel is not easily dispersed and is distributed with uneven concentration.

Hence, the present invention provides an engine having cylinders each provided with a nozzle through which fuel is injected into an intake port and a nozzle through which fuel is injected into the cylinder, the engine being capable of reducing fuel consumption when started.

Solution to Problem

An engine of an embodiment of the present invention includes first nozzles, second nozzles and a control unit. The first nozzles are arranged in a plurality of cylinders, respectively, and inject fuel directly to the cylinders. The second nozzles are arranged in intake ports of the cylinders, respectively, and inject fuel into the intake ports. The control unit controls fuel injection of the first nozzles and the second nozzles. When the engine is started, the control unit performs initial fuel injection by one of the first and second nozzles into the odd-numbered cylinders in terms of first ignition permutation of the cylinders, and performs initial fuel injection by the other one of the first and second nozzles into the even-numbered cylinders.

In this case, it is preferable that the control unit performs initial injection by the first nozzles into the even-numbered cylinders in terms of a first ignition permutation. After initial combustion in all of the cylinders is complete, the control unit performs injection by the first nozzles into all of the cylinders until a given operating condition is achieved. After the given operating condition is achieved, the control unit performs injection by the second nozzles into all of the cylinders.

At this time, the given operating condition includes at least one of a condition that the temperature of the engine's cooling water is greater than or equal to a given temperature and a condition that the engine's rate of rotation is greater than or equal to a target rate.

Advantageous Effects of Invention

According to the engine of the present invention, when the first nozzles initially inject fuel into the odd-numbered cylinders in terms of the first ignition order, the second nozzles initially inject fuel into the even-numbered cylinders in terms of the first ignition order, and when the first nozzle initially inject fuel into the even-numbered cylinders in terms of first ignition order, the second nozzles initially inject fuel into the odd-numbered cylinders in terms of the first ignition order. In any of the cases, fuel is not continuously injected from the first nozzles, pressure of fuel injected from the first nozzles reaches sufficiently high pressure.

When the engine is started, fuel injected from the first nozzle is appropriately atomized, and since fuel is injected into the cylinder, superfluous fuel is not injected and the engine can be started. Since a cylinder having an intake port into which fuel is injected from the second nozzle and a cylinder into which fuel is injected from the first nozzle are alternately ignited, variation in pressure of the fuel to be injected into the cylinder is small, and it is easy to maintain, at a high level, the pressure of fuel injected from the first nozzle. By injecting fuel from the second nozzle into the intake port, the fuel is vaporized before it enters the cylinder, and it becomes easy to ignite fuel when the engine is started. Fuel injected from the first nozzle into the cylinder is entirely utilized for combustion. As a result, the engine's rate of rotation is stabilized at an early stage after the engine is started, and the rate of rotation easily reaches the target rate. Therefore, it is possible to reduce fuel consumption when the engine is started.

According to the engine of the present invention in which the control unit performs initial injection by the first nozzles into the even-numbered cylinders in terms of the first ignition order, since it is possible to secure sufficient time for achieving the pressure necessary to inject fuel from the first nozzles, fuel injected from the first nozzles is atomized appropriately in the cylinders, and the engine can be started.

In the engine of the present invention, until the given operating condition is achieved after initial combustion in all the cylinders is complete, the control unit performs injection by the first nozzles into all of the cylinders. According to this engine, second and subsequent fuel injections are performed through the first nozzles. Therefore, it is possible to improve combustion stability immediately after the engine is started. Since the engine's rate of rotation reaches the target rate at an early stage, the fuel required for starting the engine is reduced. When fuel is injected from the first nozzle, since the fuel is injected during the compression stroke, it is easily atomized and combustion is improved. Since fuel is injected from the first nozzle directly into the cylinder, it is possible to suppress unnecessary fuel consumption.

According to the engine of the present invention in which the control unit performs injection by the second nozzles into all of the cylinders after the given operating condition is achieved, port injection by the second nozzles easily stabilizes the engine output in comparison with intra-cylinder injection by the first nozzles. This is effective for output control of the engine especially during idling, which requires control of an extremely small pulse width.

According to the engine of the present invention in which the given operating condition includes at least one of the condition that the temperature of the engine's cooling water is greater than or equal to a given temperature and the condition that the engine's rate of rotation is greater than or equal to a target rate, if any one of the conditions is satisfied, fuel injected into the intake port through the second nozzle is easily atomized. The amount of smoke (hydrocarbon [HC]) caused by fuel injected into the cylinder through the first nozzle is reliably reduced.

BRIEF DESCRIPTION OF THE SEVERAL VIEWS OF THE DRAWING

FIG. 2 is a timing chart of strokes of cylinders, fuel injection and ignition timing when the engine shown in FIG. 1 is started.

DETAILED DESCRIPTION OF THE INVENTION

Figure 1:
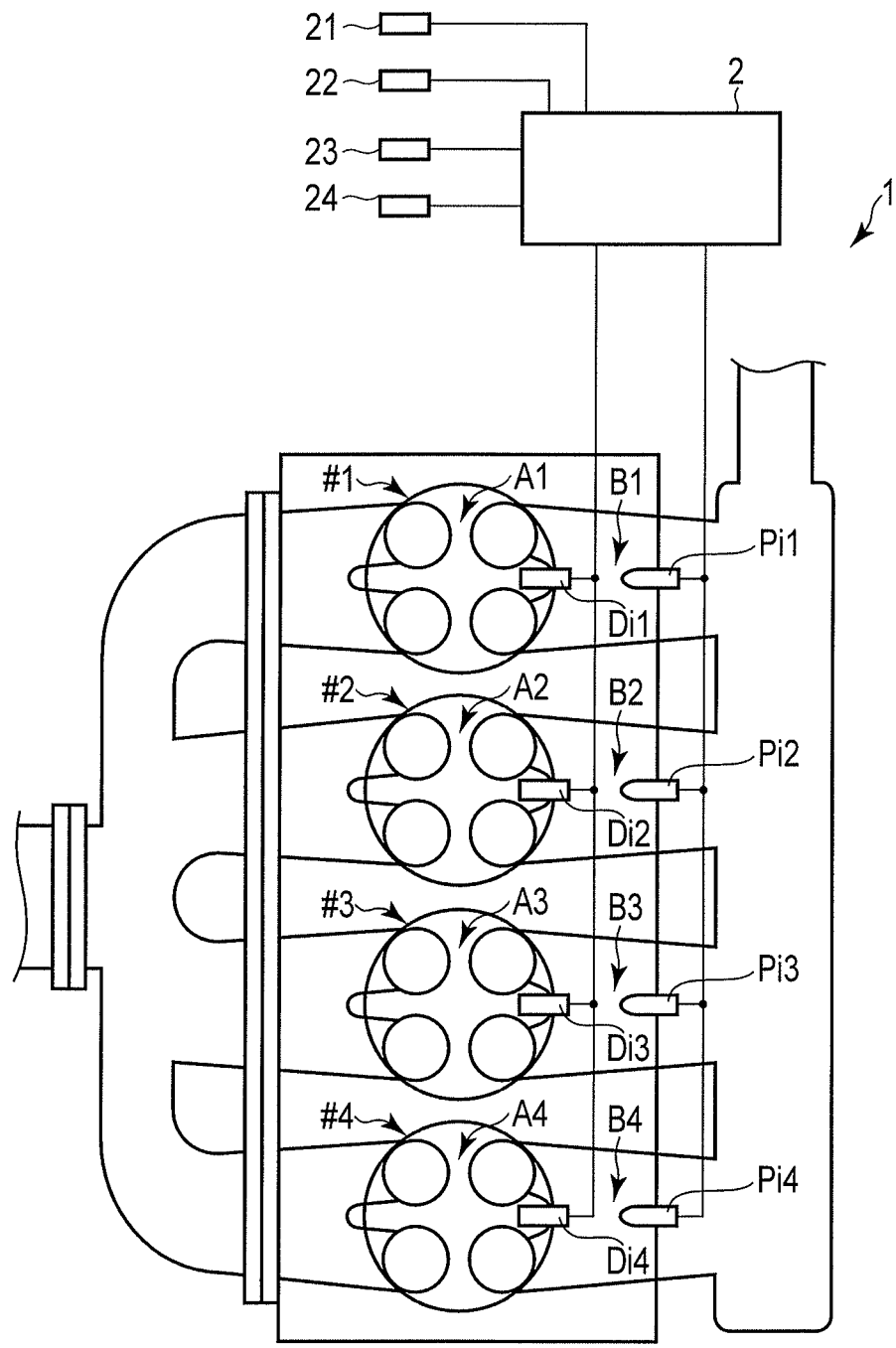
FIG. 1 is a schematic diagram showing an engine of a first embodiment of the present invention.

An engine 1 of a first embodiment of the present invention will be described with reference to FIGS. 1 to 4. The engine 1 is employed as an engine mounted in a vehicle, especially as an engine mounted in a vehicle in which idling stop operation is possible or in a hybrid vehicle. The engine 1 shown in FIG. 1 is an in-line four-cylinder engine, and this engine will be described below. The engine 1 includes four cylinders #1 to #4, first nozzles Di1 to Di4 for injecting fuel directly to intra-cylinders A1 to A4 of cylinders #1 to #4, second nozzles Pi1 to Pi4 for injecting fuel into intake ports B1 to B4 of cylinders #1 to #4, and a control unit 2 for controlling fuel injection in cylinders #1 to #4. In this description and the drawings, to inject fuel from first nozzles Di1 to Di4 is called Di injection, and to inject fuel from second nozzles Pi1 to Pi4 is called Pi injection in some cases.

The control unit (electronic control unit [ECU]) 2 which controls the fuel injection is connected to a sensor 21 for detecting that the vehicle has stopped, an idle switch (IDSW) 22 for detecting that idling stop control is performed, a temperature sensor 23 for measuring temperature of cooling water of the engine 1, and an angle sensor 24 for detecting a position of the crank angle. As the sensor 21 for detecting that the vehicle has stopped, it is possible to employ, singularly or in combination, a parking brake, a foot brake, a vehicle speed sensor, a sensor for detecting whether the transmission is in neutral, and an accelerator pedal position sensor.

Figure 3:
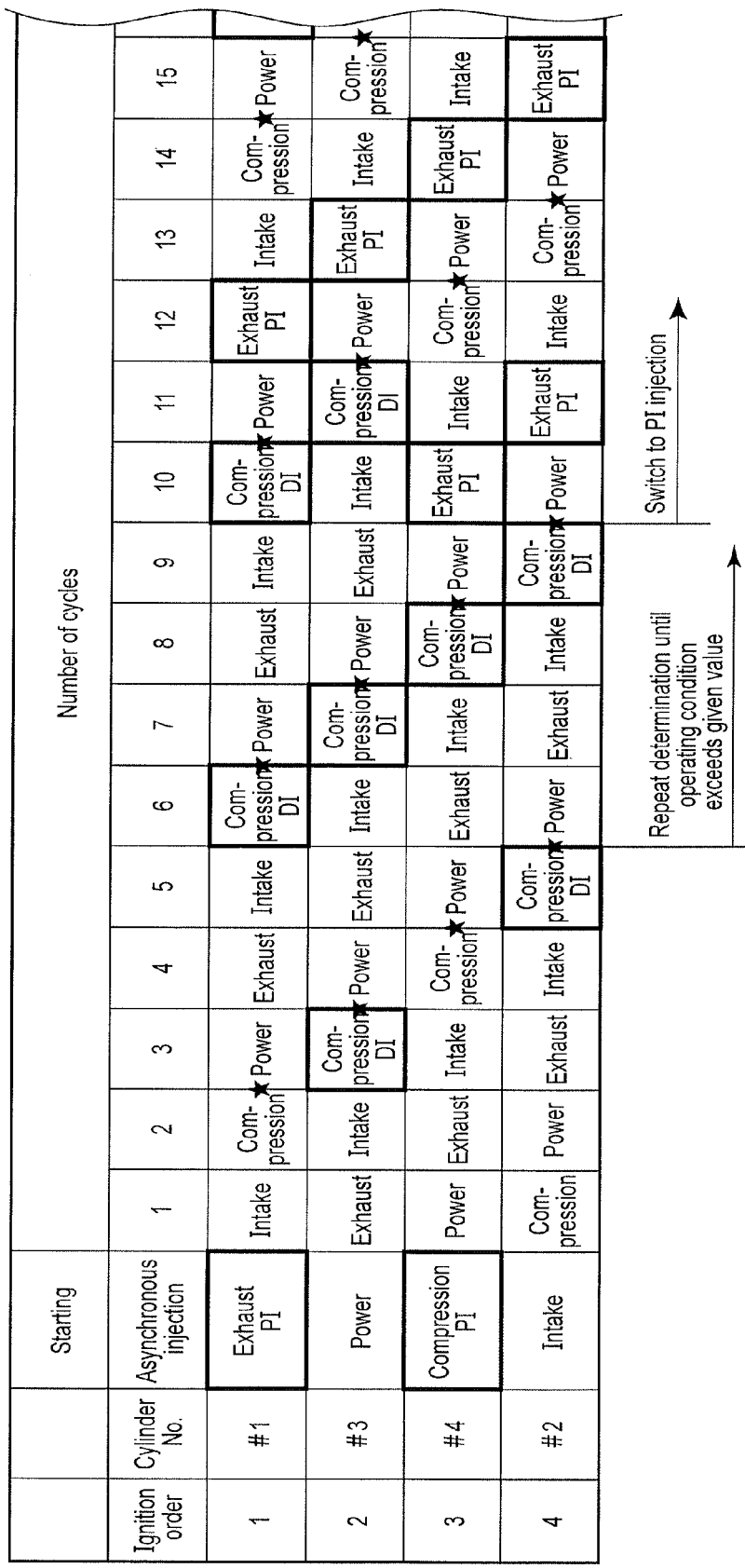
FIG. 3 is a timing chart of the strokes of the cylinders, fuel injection and ignition timing when the engine shown in FIG. 1 is started.

The engine 1 of the first embodiment is the in-line four-cylinder four-stroke engine having an intake stroke, a compression stroke, a power stroke and an exhaust stroke. Strokes and ignition order of the cylinders are determined such that cylinders are ignited at the end of the compression stroke in the order of #1→#3→#4→#2 while taking vibration and torque balance into consideration. In FIGS. 2 and 3, asterisks shown between the compression stroke and the power stroke mean that ignition is conducted at this timing.

When the engine 1 is started, in the first ignition order of cylinders #1 to #4, the control unit 2 performs initial injection into the odd-numbered cylinders by one of the first and second nozzles, and carries out initial injection into the even-numbered cylinders by the other one of the first and second nozzles. In the first embodiment, the initial injection into odd-numbered cylinders #1 and #4 is by second nozzles Pi1 and Pi4, and the initial injection into even-numbered cylinders #3 and #2 is by first nozzles Di3 and Di2, as shown in FIGS. 2 and 3.

The present embodiment is configured such that initial injection into cylinders #1 to #4 during the starting operation is proceeded by the second nozzles into cylinders which are situated in the exhaust and compression strokes at the beginning of the starting operation, and is proceeded by the first nozzles in the respective compression stroke into cylinders which are situated in the power and intake strokes at the beginning of the starting operation.

More specifically, as shown in FIGS. 2 and 3, injection is performed by second nozzles Pi1 and Pi4 into cylinder #1 situated in the exhaust stroke and cylinder #4 situated in the compression stroke when the starting operation of the engine is begun, and injection is performed by first nozzles Di3 and Di2 in the respective compression stroke into cylinder #3 situated in the power stroke and into cylinder #2 situated in the intake stroke when the starting operation of the engine is begun.

At this time, as shown in FIGS. 2 and 3, injections by second nozzles Pi1 and Pi4 into cylinder #1 which is situated in the exhaust stroke and cylinder #4 which is situated in the compression stroke when the starting operation is begun are performed at the same time at the beginning of the starting operation. This fuel injection is asynchronous injection which does not correspond to the crank angle of the engine 1.

As shown in FIGS. 2 and 3, when the initial combustion in all of cylinders #1 to #4 is complete, the control unit 2 performs injection by nozzles Di1 to Di4 into all of cylinders #1 to #4 until a given operating condition is achieved. When the given operating condition is achieved, the control unit 2 performs injection by second nozzles Pi1 to Pi4 into all of cylinders #1 to #4. Here, the given operating condition includes at least one of a condition that the temperature of the cooling water of the engine 1 is greater than or equal to a given temperature and a condition that the rate of rotation of the engine 1 is greater than or equal to a target rate.

Figure 4:
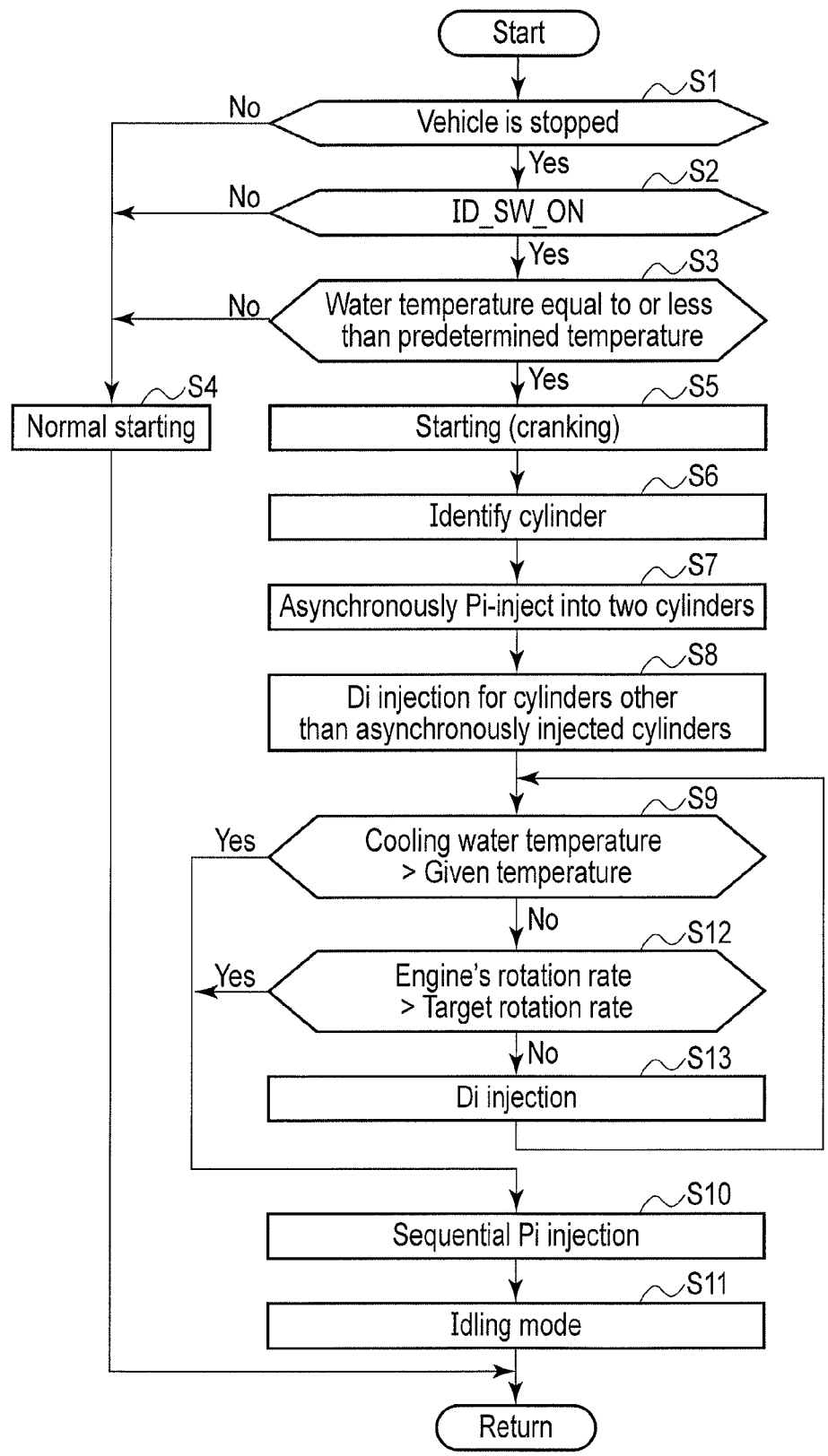
FIG. 4 is a flowchart when the engine shown in FIG. 1 is started.

Start control by the control unit 2 will be described below. When the start control is begun, the control unit 2 determines (S1) whether the vehicle is stopped based on a signal from the sensor 21 as shown in FIG. 4. If the vehicle is stopped, it is determined (S2) whether the idle switch 22 is turned ON. If the idle switch 22 is turned ON, i.e., when the engine 1 is stopped, it is determined (S3) whether the temperature measured by the temperature sensor 23 is less than or equal to a predetermined value. In this case, the predetermined value which is set in the temperature sensor 23 is about 20° C. for example. If the vehicle is not stopped in S1, or if the idle switch 22 is turned OFF in S2, or if the temperature of the cooling water is greater than or equal to the predetermined value in S3, the engine 1 is started (S4) under normal start control.

If the temperature of the cooling water is less than or equal to the predetermined value in S3, i.e., when the engine 1 is cold state, cranking is performed (S5) when the engine is during the starting operation, and it is identified (S6) which strokes cylinders #1 to #4 are in based on the crank angle detected by the angle sensor 24.

Of the identified strokes of cylinders #1 to #4, asynchronous injection (S7) which involves Pi injection is performed for cylinders in the exhaust stroke and the compression stroke at the same time when the control for starting the engine is begun. For example, as shown in FIGS. 2 and 3, second nozzles Pi1 and Pi4 simultaneously inject fuel into intake ports B1 and B4 for cylinder #1 which is in the exhaust stroke and cylinder #4 which is in the compression stroke when the starting operation begins. An intake valve is closed in the compression stroke, the power stroke and the exhaust stroke. Therefore, injected fuel is vaporized in intake ports B1 and B4. As shown in FIGS. 2 and 3, ignition orders of cylinders #1 and #4 in which Pi injection is carried out are first and third.

As shown in the flowchart of FIG. 4, fuel is injected (S8) directly into intra-cylinders A3 and A2 of cylinders other than asynchronously injected cylinders, i.e., cylinders #3 and #2 by first nozzles Di3 and Di2 in accordance with the ignition orders. In a cylinder situated in the power stroke when the starting operation is begun in FIGS. 2 and 3, i.e., in the cylinder #3 having the second ignition order, Di injection is performed in the initial compression stroke, i.e., in the compression stroke of the third cycle after the starting operation is begun. In a cylinder situated in the intake stroke when the starting operation is begun in FIGS. 2 and 3, i.e., in the cylinder #2 having the fourth ignition order, Di injection is performed in the secondary compression stroke, i.e., in the compression stroke of the fifth cycle after the starting operation is begun.

As shown in FIGS. 2 and 3, ignition starts from the end of the second cycle of cylinder #1 in accordance with the ignition order. As a result, in any of the cases in FIGS. 2 and 3, the cylinders (#1, #4) in which Pi injection is preformed and the cylinders (#3, #2) in which Di injection is performed are alternately ignited. The operation in which cylinders performed Pi injection and cylinders performed Di injection are alternately ignited is kept until at least one ignition sequence of all of cylinders #1 to #4 has been ignited.

If at least one ignition sequence of all of cylinders #1 to #4 has been performed, the control unit 2 switches fuel injection for all of cylinders #1 to #4 to Di injection as shown in FIG. 3 until the given operating condition is satisfied. When the given operating condition is satisfied, fuel injection for all of cylinders #1 to #4 is switched to Pi injection as shown in FIG. 2. In this embodiment, temperature of cooling water of the engine 1 and the engine's rate of rotation are monitored as operating conditions.

If one ignition sequence of all of cylinders #1 to #4 has been performed, the control unit 2 first determines (S9) whether the temperature of the cooling water of the engine 1 is greater than or equal to a given temperature based on the temperature detected by the temperature sensor 23. If the temperature of the cooling water is greater than or equal to the given temperature, Pi injection control (Pi sequential injection) (S10) is sequentially started from the cylinders which have not yet passed through the exhaust stroke and for which fuel has not yet been injected into the intake ports (B1 to B4) by the second nozzles (Pi1 to Pi4), and the mode is shifted to idle (S11).

If the temperature of the cooling water has not yet reached the given temperature in S9, the control unit 2 determines (S12) whether the engine's rate of rotation has become higher than the target rate. If the engine's rate of rotation has become higher than the target rate, Pi injection control (Pi sequential injection) (S10) is sequentially started from the cylinders which have not yet passed through the exhaust stroke and in which fuel has not yet injected into the intake ports (B1 to B4) by the second nozzles (Pi1 to Pi4), and the mode is shifted to idle (S11).

FIG. 2 shows a case where in control for starting the engine 1, the given operating condition (when the temperature of the cooling water is greater than or equal to a given temperature or when the engine's rate of rotation has reached a target rate) is satisfied in the third cycle before one ignition sequence of all of the cylinders has been performed. If the given operating condition is satisfied while one ignition sequence is being performed, the control unit 2 switches cylinders #3 and #2 in which Di injection is performed until then to Pi injection. In order to ignite for Pi injection at the end of the sixth cycle which is a second cycle for cylinder #1, Pi injection is performed in the exhaust stroke of the fourth cycle. Since fuel injection has not yet been performed in cylinder #2 at the time of the third cycle, injection is switched to Pi injection after Di injection and ignition is performed in the compression stroke of the fifth cycle. In cylinder #2, injection is switched to Pi injection in the exhaust stroke of the seventh cycle.

FIG. 3 shows a case where in the control for starting the engine 1, the given operating condition is not satisfied even after one ignition sequence of all of cylinders #1 to #4 has been performed, i.e., the temperature of the cooling water is not greater than or equal to the given temperature and the engine's rate of rotation has not reached the target rate. If the given operating condition is not satisfied while one ignition sequence is being performed, the control unit 2 cancels the Pi injection in the exhaust stroke, and thereafter performs Di injection in the compression stroke. That is, in FIG. 3, if the given operating condition is not satisfied in the third and fourth cycles, Pi injection is not performed in the exhaust stroke of the fourth cycle of cylinder #1 and in the exhaust stroke of the fifth cycle of cylinder #3, and the injection is switched to Di injection (S13) in all of cylinders #1 to #4. Then, determination in S9 and S12 is repeated and the Di injection (S13) is continued until the temperature of the cooling water becomes greater than or equal to the given temperature or the engine's rate of rotation exceeds the target rate.

When the temperature of cooling water becomes greater than or equal to the given temperature after Di injection is continued, or when the engine's rate of rotation reaches the target rate, the control is switched to Pi injection control (S10) as shown in FIG. 4, and the mode is shifted to idling mode (S11). When the injection is switched to Pi injection after Di injection is performed for all of the cylinders, injection is sequentially switched to Pi injection for cylinders which do not pass through the exhaust stroke when the given operating condition is satisfied. In FIG. 3, if the operating condition becomes greater than or equal to the given value in the ninth cycle, Di injection is performed until the compression stroke immediately thereafter in the cylinders which pass through the exhaust stroke at that time as shown in a tenth cycle of cylinder #1 and an eleventh cycle of cylinder #3. When the operating condition reaches the given operating condition, Pi injection is started from the exhaust stroke of the tenth cycle and the eleventh cycle in cylinders #4 and #2 which have not yet passed through the exhaust stroke.

In the engine 1 having first nozzles Di1 to Di4 which inject fuel directly into intra-cylinders A1 to A4 and second nozzles Pi1 to Pi4 which inject fuel into intake ports B1 to B4 of the cylinders as described above, asynchronous injection is performed by Pi injection (port injection) for the first and third cylinders (#1, #4) in terms of the ignition order at the same time when the starting operation is begun, and Di injection (direct injection) is performed in the compression stroke for the other cylinders (#3, #2). When the engine 1 is started, cylinders in which Pi injection is performed and cylinders in which Di injection is performed are alternately ignited. Since the Di injection is included, even when the engine is started from the cold state, consumed starting fuel is reduced, and exhaust gas component is enhanced, i.e., HC (hydrocarbon) is reduced. The Pi injection is performed when the starting operation is begun as the asynchronous injection and thereafter, Di injection is performed in the compression stroke. Hence, the crankshaft rotates at least once until Di injection is performed. As a result, since it is possible to secure fuel pressure which is necessary for the Di injection, fuel injected by the first nozzle Di is reliably atomized.

Although FIGS. 2 and 3 show as if ignition is started from cylinder #1, the ignition order does not always start from cylinder #1. Ignition may be started from any of cylinders

1, #2, #3, and #4 in accordance with the crank angle in a state where the engine 1 has stopped. However, when cylinders #1, #2, #3, and #4 are arranged in series, even if ignition starts from any of cylinders #1→#3→#4→#2→#1, a cylinder which is ignited next is determined.

The engine 1 of the present invention is applied not only to the case where the engine 1 is started from the cold state in a vehicle provided with only the four-cylinder engine 1, but also be applied to a case where the engine 1 is started from the cold state in a hybrid vehicle including a drive motor and a battery together with the engine 1.

An engine 1 of a second embodiment of the present invention will be described with reference to FIGS. 5 to 7. This engine 1 is different from the engine 1 of the first embodiment in that the engine 1 is a three-cylinder engine. The same reference symbols or characters are allocated to configurations having the same functions as those of the engine 1 of the first embodiment, and for detailed description thereof, see corresponding description of the first embodiment.

Figure 5:
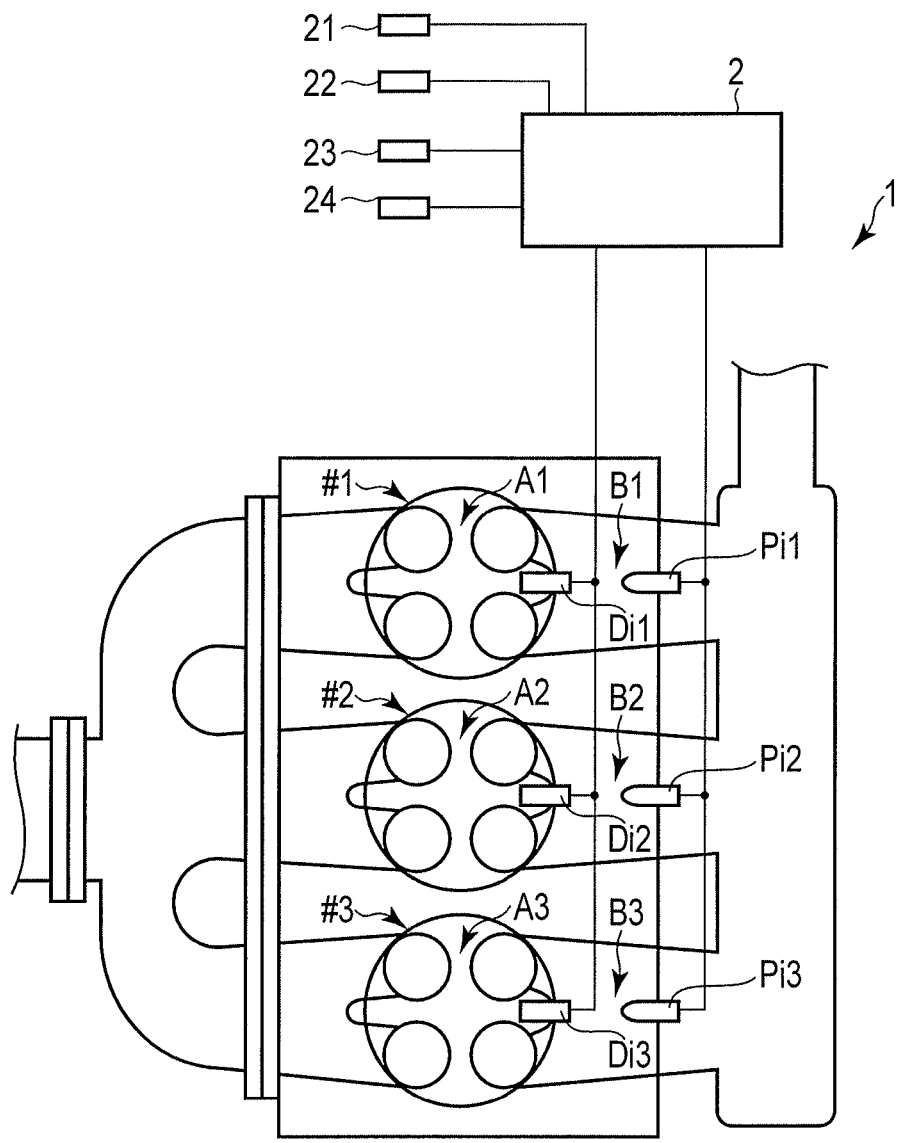
FIG. 5 is a schematic diagram showing an engine of a second embodiment of the present invention.
Figure 6:
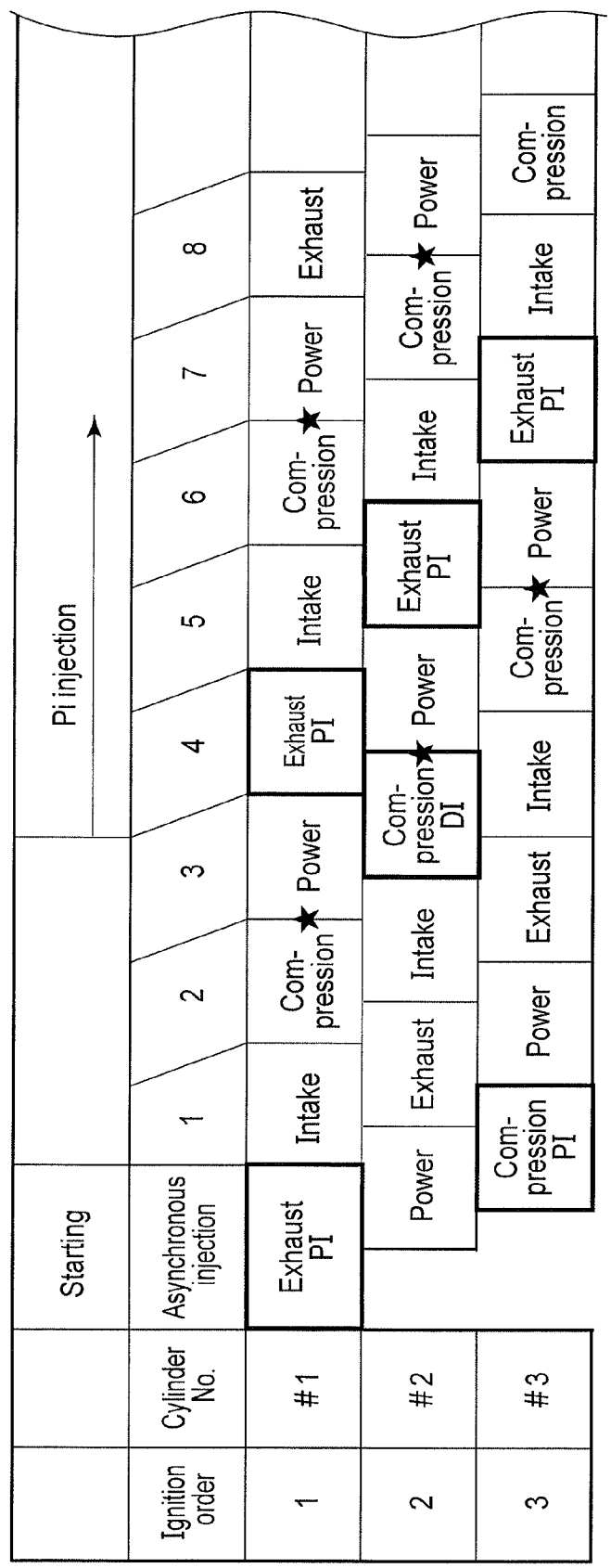
FIG. 6 is a timing chart of strokes of cylinders, fuel injection and ignition timing when the engine shown in FIG. 5 is started.
Figure 7:
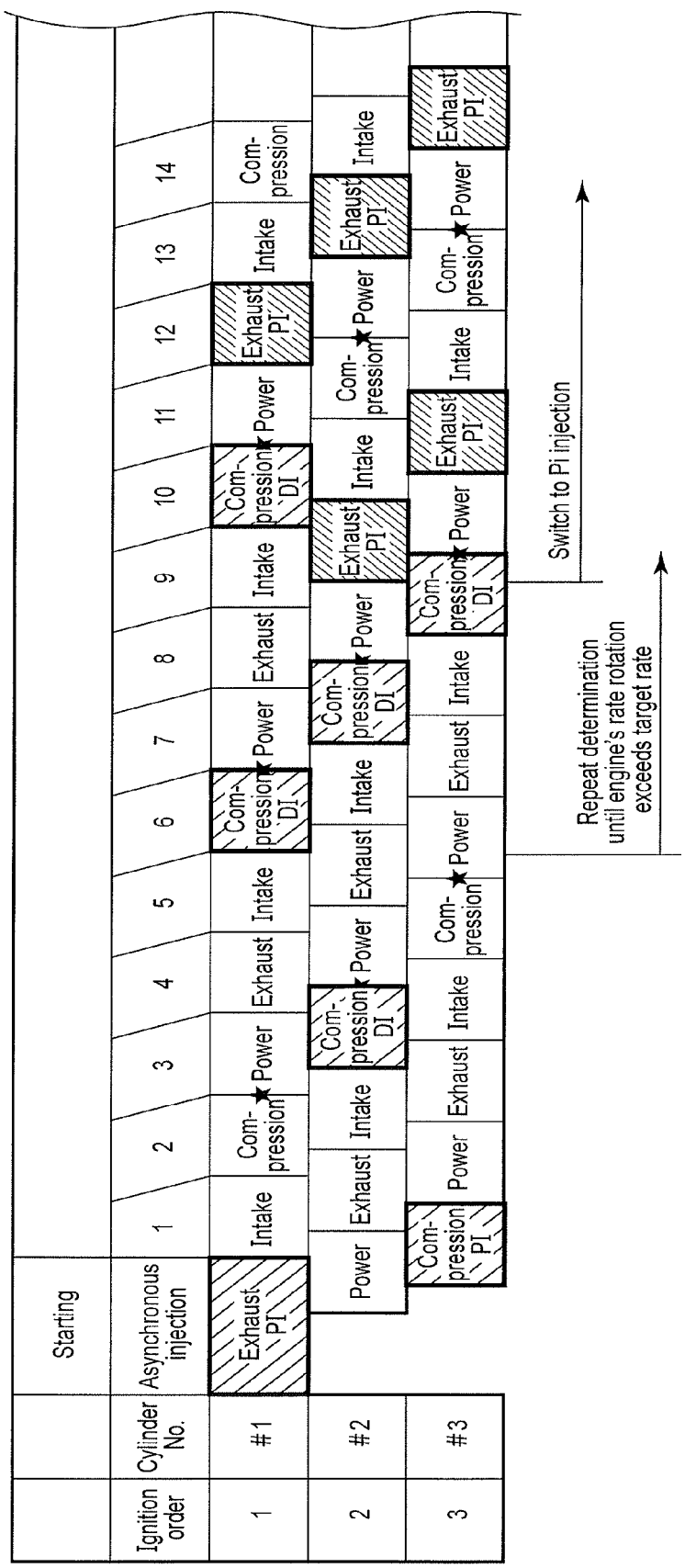
FIG. 7 is a timing chart of the strokes of the cylinders, fuel injection and ignition timing when the engine shown in FIG. 5 is started.

The engine 1 of the first embodiment is a three-cylinder four-stroke engine as shown in FIG. 5, and strokes and ignition orders of the cylinders are determined such that the cylinders are ignited at the end of the compression strokes from cylinder #1 in the order of #1→#2→#3→#1 as shown in FIGS. 6 and 7. As in the first embodiment, asterisks shown between the compression stroke and the power stroke show ignition timing of cylinders #1 to #3 as shown in FIGS. 6 and 7. The engine 1 includes first nozzles Di1 to Di3 which are respectively arranged in cylinders #1 to #3 and which inject fuel directly to intra-cylinders A1 to A3, second nozzles Pi1 to Pi3 which are respectively arranged in intake ports B1 to B3 of cylinders #1 to #3 and which inject fuel into the intake ports, and a control unit 2 for controlling these members.

The control unit 2 makes second nozzles (e.g., second nozzles Pi1 and Pi3) initially inject fuel into the odd-numbered cylinders (e.g., the first cylinder #1 and the third cylinder #3 in FIGS. 6 and 7) in terms of the initial ignition order of cylinders #1 to #3 when the engine 1 is started, and makes first nozzle (e.g., first nozzle Di2) initially inject fuel into the even-numbered cylinder (e.g., the second cylinder #2 in FIGS. 6 and 7). When the starting operation of the engine 1 is begun, cylinder #1 is located in the exhaust stroke, cylinder #2 is located in the power stroke and cylinder #3 is located in the compression stroke. Since the engine 1 has the three cylinders, there is a phase difference of about 60° between start timings of the respective strokes in a precise sense.

When control for starting the engine 1 is begun, the control unit 2 makes second nozzles Pi1 and Pi3 substantially simultaneously inject fuel into intake ports B1 and B3 for the cylinder #1 which is ignited first and the cylinder #3 which is ignited third when each cylinder is initially ignited. This ignition timing is asynchronous ignition which does not correspond to the crank angle of the engine 1. In the cylinder #2 which is ignited in an even-numberth order, the first nozzle Di2 injects fuel directly to the intra-cylinder A2 and therefore, fuel is injected in the compression stroke of the cylinder #2.

It is not always true that cylinder #1 is always in the exhaust stroke when the starting control of the engine 1 is begun. If a stroke of the cylinder having the first ignition order is before the compression stroke and after the power stroke, there is secured sufficient time during which fuel injected by second nozzles Pi1 to Pi3 into intake ports B1 to B3 is vaporized until the fuel is drawn by and loaded into intra-cylinders A1 to A3. As a result, a time until one of first nozzles Di1 to Di3 injects fuel into respective intra-cylinders A1 to A3 of cylinders #1 to #3 having the second ignition order, i.e., until the compression stroke of the cylinder which is ignited second in ignition order, is obtained greater than that until the first cylinder is loaded. That is, there is obtained time during which injection pressure necessary for first nozzles Di1 to Di3 is secured.

Since initial fuel injection into the cylinder having the even-numbered in the initial ignition order, in this embodiment into cylinder #2, is performed by the first nozzle Di2, it is possible to increase pressure to a value required for the fuel injection. Further, a cylinder into which fuel is supplied by the Pi injection and a cylinder into which fuel is supplied by the Di injection are alternately ignited. Therefore, when the engine 1 is started from the cold state, the amount of hydrocarbons (HC) discharged is reduced in comparison with the case where the engine is started only by Pi injection, and oil dilution is reduced in comparison with the case where the engine is started only by Di injection.

The control unit 2 of the engine 1 switches the fuel injection for all of cylinders #1 to #3 into the Di-injection by the first nozzles Di1 to Di3 when the given operating condition is not satisfied after initial combustion in all of cylinders #1 to #3 is completed, and the control unit 2 switches the fuel injection for all of cylinders #1 to #3 into the Pi-injection by the second nozzles Pi1 to Pi3 when the given operating condition is satisfied after initial combustion in all of cylinders #1 to #3 is completed. FIG. 6 shows a case where the given operating condition is satisfied when the initial combustion in all of cylinders #1 to #3 is completed, and FIG. 7 shows a case where the given operating condition is not satisfied when the initial combustion in all of cylinders #1 to #3 is completed. In FIG. 7, all of second fuel injections for cylinders #1 to #3 are performed by Di injection.

In the second embodiment, as same as the first embodiment, as the given operating condition, it is monitored that the temperature of the cooling water of the engine 1 is greater than or equal to the given temperature or that the rate of rotation of the engine 1 is greater than or equal to the target rate, and fuel injections of all of cylinders #1 to #3 are switched to the Pi injection performed by second nozzles Pi1 to Pi3 when the conditions are satisfied. Since the fuel injection of the Pi injection must be performed earlier than ignition timing as compared with the fuel injection of the Di injection, the Di injection and the Pi injection are mixed in the some sequence as shown in FIG. 7 when Di injection is switched to the Pi injection. In FIG. 7, it is detected that the engine's rate of rotation exceeds the target rate, and the fuel injection is shifted to the Pi injection.

The control for starting the engine 1 by the control unit 2 in the second embodiment is the same as that of the first embodiment. Therefore, the control is performed in accordance with the flowchart shown in FIG. 4. In S3 in FIG. 4, it is determined whether the engine 1 is cold state. In the case of the present invention, the initial fuel injection into a cylinder having the odd-numbered ignition order is performed by the second nozzles Pi1 to Pi3, and the initial fuel injection into a cylinder having the even-numbered ignition order is performed by the first nozzles Di1 to Di3. Therefore, there is sufficient time until Pi-injected fuel is vaporized irrespective of whether the engine is started from the cold state or the warm state, and it is possible to smoothly start the engine 1 and to sufficiently secure fuel pressure for the Di injection which is performed in the even-numbered order. Since the control of the fuel injection in the cold state starting and the warm state starting can be operated based on the same control flow, the control is simplified.

What is claimed is:

1. An engine comprising:
   at least one cylinder having an odd-number;
   at least one cylinder having an even number;
   a first nozzle arranged in each cylinder and configured to inject fuel directly into a corresponding cylinder;
   a second nozzle arranged in an intake port of each cylinder and configured to inject fuel into the intake port of the corresponding cylinder; and
   a control unit configured to control fuel injection of the first nozzle and the second nozzle, wherein
   the control unit operates initial fuel injection into the at least one cylinder having an odd-number in an initial ignition order by using one of the first nozzle and the second nozzle, and operates initial fuel injection into the at least one cylinder having an even number in an initial ignition order by using the other one of the first nozzle and the second nozzle, when the engine is started,
   the control unit operates the second nozzle to inject fuel in the initial fuel injection when an intake valve of the corresponding cylinder is closed,
   the control unit operates initial fuel injection into the at least one cylinder having the even number in the initial ignition order by using the first nozzle, and
   the control unit makes the first nozzle of all cylinders inject fuel into all of the corresponding cylinders until a given operating condition is satisfied after initial combustion in all of the cylinders is completed.

2. The engine of claim 1, wherein
   the control unit makes the second nozzle of all cylinders inject injects fuel into all of the corresponding cylinders after the given operating condition is satisfied.

3. The engine of claim 1, wherein
   the given operating condition includes at least one of a condition that a temperature of the engine's cooling water is greater than or equal to a given temperature and a condition that the engine's rate of rotation is greater than or equal to a target rate.

4. The engine of claim 2, wherein
   the given operating condition includes at least one of a condition that a temperature of the engine's cooling water is greater than or equal to a given temperature and a condition that the engine's rate of rotation is greater than or equal to a target rate.

5. An engine, comprising:
   at least one cylinder having an odd-number;
   at least one cylinder having an even number;
   a first nozzle arranged in each cylinder and configured to inject fuel directly into a corresponding cylinder;
   a second nozzle arranged in an intake port of each cylinder and configured to inject fuel into the intake port of the corresponding cylinder; and
   a control unit configured to control fuel injection of the first nozzle and the second nozzle, wherein
   the control unit operates initial fuel injection into the at least one cylinder having an odd-number in an initial ignition order by using one of the first nozzle and the second nozzle, and operates initial fuel injection into the at least one cylinder having an even number in an initial ignition order by using the other one of the first nozzle and the second nozzle, when the engine is started, and
   the control unit operates the second nozzle to inject fuel in the initial fuel injection when an intake valve of the corresponding cylinder is closed, wherein
   the control unit makes the first nozzle of all cylinders inject fuel into all of the corresponding cylinders until a given operating condition is satisfied after initial combustion in all of the cylinders is completed.

6. The engine of claim 5, wherein
   the control unit makes the second nozzle of all cylinders inject fuel into all of the corresponding cylinders after the given operating condition is satisfied.

7. The engine of claim 5, wherein
   the given operating condition includes at least one of a condition that a temperature of the engine's cooling water is greater than or equal to a given temperature and a condition that the engine's rate of rotation is greater than or equal to a target rate.

8. The engine of claim 6, wherein
   the given operating condition includes at least one of a condition that a temperature of the engine's cooling water is greater than or equal to a given temperature and a condition that the engine's rate of rotation is greater than or equal to a target rate.

* * * * *